June 24, 1969  NAOYUKI UNO ET AL  3,451,323
CAMERA LIGHT RESPONSE SYSTEM

Filed July 14, 1966

INVENTORS
NAOYUKI UNO
TADAZUMI SAKAZAKI
MINORU SUZUKI
BY
Stanley Wolder
ATTORNEY _United States Patent Office_

3,451,323
Patented June 24, 1969

3,451,323
CAMERA LIGHT RESPONSE SYSTEM
Naoyuki Uno, Urawa-shi, and Tadazumi Sakazaki and Minoru Suzuki, Tokyo-to, Japan, assignors to Asahi Kogaku Kogyo Kabushiki Kaisha, Itabashi-ku, Tokyo-to, Japan, a corporation of Japan
Filed July 14, 1966, Ser. No. 565,149
Claims priority, application Japan, Aug. 21, 1965, 40/50,931
Int. Cl. G03b 19/12
U.S. Cl. 95—42       4 Claims

ABSTRACT OF THE DISCLOSURE

A light measuring system in a single lens reflex camera having a penta-prism and an eyepiece facing the penta-prism rear. A pair of light directing prisms are located on opposite sides of the eyepiece, having inlet faces directed toward the penta-prism and outlet faces directed toward a photoresistor. The outlet faces of the prisms may be directed toward each other with the photoresistor placed therebetween, or facing a common direction toward a common face of the photoresistor.

---

The present invention relates generally to improvements in photographic cameras and it relates particularly to a single lens reflex camera provided with an improved system for measuring the light passing through the camera objective lens.

The measurement of the light passing through the objective lens of a single lens reflex camera has been commonly employed as an indication of the light intensity or for controlling the exposure parameters such as the shutter speed and diaphragm opening. However, an accurate measurement of the overall light passing through the objective lens as an indication or control measurement for effecting an optimum exposure has heretofore been very difficult to achieve. A known practice in single lens reflex cameras is to measure the light intensity by the use of a pair of light receiving photosensitive elements positioned along opposite sides of the viewing eyepiece. This expedient possesses a very important drawback and disadvantage. For the suitable operation of the aforesaid system it is essential that the difference between the light response characteristics of the two photosensitive elements be at an absolute minimum. As a consequence, the light response elements must be accurately matched, a procedure which is time consuming, expensive and inconvenient and hence significantly contributes to the cost of the camera and reduces its reliability.

It is therefore a principal object of the present invention to provide an improved photographic camera.

Another object of the present invention is to provide a single lens reflex camera having an improved through-the-lens light measuring system.

Still another object of the present invention is to provide in a single lens reflex camera, a through-the-lens light measuring system which provides an optimum light measurement by the use of a single light responsive element.

A further object of the present invention is to provide an improved camera light measuring system of the above nature characterized by its accuracy, flexibility, compactness, reliability and low cost.

The above and other objects of the present invention will become apparent from a reading of the following description taken in conjunction with the accompanying drawings, wherein.

In a sense the present invention contemplates the provision of a photographic camera comprising a viewing system including an eyepiece, a photosensitive element, and means for directing the light which is directed toward a plurality of areas in the proximity of said eyepiece to said photosensitive element. The present system is advantageously applied to a single lens reflex camera including an objective lens, a swingable mirror positioned behind the objective lens and a pentaprism located above the mirror, the eyepiece being disposed behind the pentaprism and directed toward its outlet face. According to a preferred form of the present camera the light directing means includes a pair of light reflector prisms positioned on opposite sides of the eyepiece and having input faces directed toward the pentaprism and horizontal top faces directed toward the photosensitive element. In accordance with another form of the present system the light directing prisms disposed on opposite sides of the eyepiece have confronting outlet faces with the photosensitive element being positioned between these faces.

Figure 1:
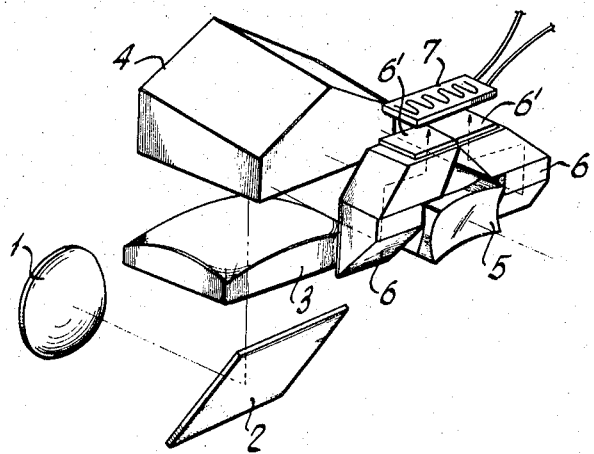
FIGURE 1 is a perspective view of a range finder optical system of a single lens reflex camera provided with a light measuring arrangement embodying the present invention.

Referring now to the drawings, and particularly FIGURE 1 thereof which illustrates a preferred embodiment of the present invention, the reference numeral 1 generally designates an objective lens forming a part of a single lens reflex camera which includes a mirror 2 swingable in the known manner from a shutter cocked advanced position intercepting the optical axis of the objective lens 1 and a shutter open retracted position. An image glass 3 is positioned above the mirror 3, and a conventionally shaped and positioned pentaprism 4 is located in the camera roof above the image glass screen and is provided with a rearwardly direct outlet face from which the image light rays emerge. A rectangular lens eyepiece 5 is positioned behind and faces the rear face of the pentaprism 4 and forms therewith and the image glass, mirror 2 and objective lens 1 a viewing system.

A pair of symmetrically shaped and positioned light directing prisms 6 are located along and adjacent to the sides of the eyepiece 5 and include front faces at the level of the eyepiece 5 directed toward the pentaprism rear face and a pair of prisms 6' cooperating with and positioned above the prisms 6. The prisms 6 and 6' are shaped to receive light rays directed from the pentaprism 4 onto the front face of the prisms 6 upwardly, then inwardly toward each other and then upwardly to emerge from the top faces of the prisms 6' as shown by broken line in FIGURE 1.

A photosensitive element, preferably a cadmium sulfide photoresistor 7, is located above and confronts the top outlet faces of the upper prisms 6' so as to be exposed to the rays emerging from the pentaprism 4 and incident on the front faces of the prisms 6. Thus the light rays from the pentaprism 4 directed to the areas along opposite sides of the eyepiece 5 are reflected or guided into incidence which may be superimposed on a common photosensitive element 7 so that their effectiveness is dependent merely on the character and intensity of the incident light, and, unlike the systems employing a pair of photoresistors, not on any difference in the response characteristics of the pair of photoresistors. The terminals of the photoresistor 7 are connected through a voltage source, for example a battery, to a current meter, for providing an indication of the light passing through the objective lens 1 or for controlling one of the exposure parameters, in accordance therewith, for example, the shutter speed or diaphragm opening, or for controlling one of these parameters through a suitable timing or control network.

Figure 2:
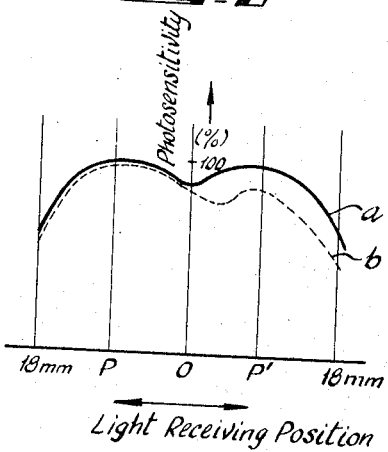
FIGURE 2 is a graph illustrating the light response characteristics of the light measuring system embodying the present invention compared to that employing a pair of photosensitive elements.

It is very difficult to obtain a uniform photosensitivity over one entire light receiving surface and it is still more difficult to obtain two elements of equal photosensitivity characteristics. If, in a two light receiving photosensitive element system, the photosensitivity of one light receiving element is not equal to that of the other light receiving element, as indicated by the dotted line b and two symmetrical points P and P', of FIG. 2, the resultant indication with light rays issuing from a particular object and incident upon the point P is different from that with the same light rays incident upon the point P'. In the present system, however, a single light receiving element 7 is utilized so that there is provided an approximately symmetrical photosensitivity characteristic curve as indicated by the solid line a of FIG. 2. Thus the aforementioned disadvantage of a two photosensitive element system is eliminated and an accurate light measurement can be effected.

It should be noted that the light deflecting prism assembly 6, 6' as described above may advantageously be replaced by other systems for directing the light incident on the different areas along the sides of the eyepiece 5 to a common photosensitive element 7, such as light guides, for example optical fiber light guides. The use of the light guides provides a greater freedom of position of the light responsive element 7 and thus permits the use of unoccupied spaces in the camera body and the achievement of greatest compactness.

While the use of two laterally spaced oppositely positioned light directors as described above is highly satisfactory, the light measuring efficiency is further improved by directing the light rays from other areas around the eyepiece 5 to the common photosensitive element 7, for example, from areas above and below the eyepiece 5, by arrangements similar to that above set forth. If a light amount adjusting element, such as a diaphragm or an optical wedge coupled to an objective diaphragm preset ring, is arranged at the light ray issuing surface of each of the prisms systems 6, 6' and 6, 6', light measurement under preset stopped-down diaphragm conditions can be carried out with the objective diaphragm fully open, and further, light measurement in consideration of film sensitivity can be performed.

Figure 3:
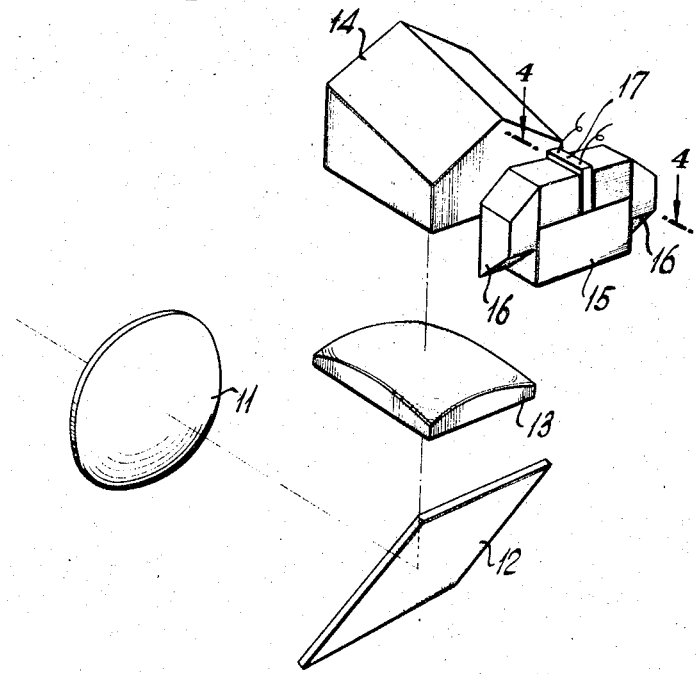
FIGURE 3 is a view similar to FIGURE 1 of another embodiment of the present invention.
Figure 4:
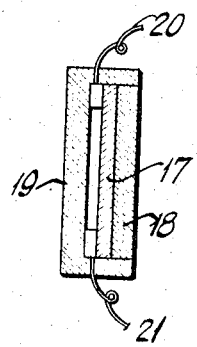
FIGURE 4 is an enlarged sectional view taken along line 4—4 in FIGURE 3.

The embodiment of the present invention illustrated in FIGURES 3 and 4 of the drawings differs from that first described primarily in the positioning and structure of the photosensitive element and the structure of the associated light directing prisms. Specifically, the camera is a single lens reflex camera including an objective lens 11, swingable mirror 12, an image glass 13, a pentaprism 14 and an eyepiece 15 constructed and associated in the manner of the corresponding components of the earlier described embodiment.

Located along opposite sides of the eyepiece 15 is a symmetrically shaped and positioned pair of laterally spaced light deflecting prisms 16 having inlet faces at the level of the eyepiece 15 directed toward the rear outlet face of the pentaprism 14 and confronting parallel vertical laterally spaced outlet faces located above the eyepiece 15. The prisms 16 are so shaped that light rays entering the prism front inlet faces are reflected vertically upwardly and then toward each other above the eyepiece 15.

A photosensitive member or assembly is positioned between the confronting outlet faces of the prisms 16. The photosensitive assembly advantageously includes a photoresistor element in the form of a thin cadmium sulfide plate 17 provided with terminal leads 20 and 21 at opposite ends thereof. The photoresistor 17 is positioned in a housing 19 formed of a clear transparent material sealed with a cover plate 18 of similar material. Thus the light directed to areas along opposite sides of the eyepiece 15 is directed by the prisms 16 into incidence onto opposite faces of the photoresistor 17. The electrical resistance of the photoresistor 17 is therefore varied in accordance with the total light received thereby from the areas along the opposite sides of the eyepiece 15 and correspondingly controls an indicating meter or the camera exposure parameters or both in the manner earlier set forth.

Employing the systems of the present invention the requirement of a pair of photoresistors of equal indices of photoresistance variation is obviated. Furthermore, the structure may be highly compact and conveniently and readily located in any available space in the camera body. The system is accurate and reliable and is inexpensive as a consequence of the use of a single photoresistor.

While there have been illustrated and described preferred embodiments of the present invention, it is apparent that numerous alterations, omissions and additions may be made without departing from the spirit thereof.

What is claimed is:
1. A photographic single lens reflex camera comprising a viewing system including the camera, objective lens, a reflector disposed rearwardly of said lens, an eyepiece, and a pentaprism having a face directed toward said reflector member and a face directed toward said eyepiece, a photosensitive element, and means for directing light from said pentaprism to said photosensitive element and including light receiving surfaces exposed to areas oppositely offset from the eyepiece viewed area and located outside of the image viewing field of said eyepiece.

2. The photographic camera of claim 1 wherein said light directing means includes a pair of prisms having inlet faces along opposite sides of said eyepiece and facing said pentaprism and outlet faces directed toward said photosensitive element.

3. A photographic single lens reflex camera comprising a viewing system including the camera, objective lens, a reflector disposed rearwardly of said lens, an eyepiece, and a pentaprism having a face directed toward said reflector member and a face directed toward said eyepiece, a pair of prism means having inlet faces along opposite sides of said eyepiece and facing said pentaprism and outlet faces directed toward each other, and a photoresistor disposed between said prism outlet faces.

4. A photographic single lens reflex camera comprising a viewing system including the camera, objective lens, a reflector disposed rearwardly of said lens, an eyepiece, and a pentaprism having a face directed toward said reflector member and a face directed toward said eyepiece, a pair of prism means having inlet faces along opposite sides of said eyepiece and facing said pentaprism and outlet faces facing a substantially common direction, and a photoresistor having a common face directed toward said prism outlet faces.

References Cited
UNITED STATES PATENTS

| | | | |
|---|---|---|---|
| 3,093,044 | 6/1963 | Lederer | 95—42 |
| 3,264,964 | 8/1966 | Ebertz | 95—42 |
| 3,282,178 | 11/1966 | Nelson | 95—42 |
| 3,324,776 | 6/1967 | Matsumoto | 95—42 |

NORTON ANSHER, *Primary Examiner.*

CHARLES B. FUNK, *Assistant Examiner.*